Sept. 6, 1927.  
W. L. HANLEY, JR  
1,641,582  
PLANT FOR MANUFACTURING CERAMIC PRODUCTS  
Filed June 2, 1925  
2 Sheets-Sheet 1
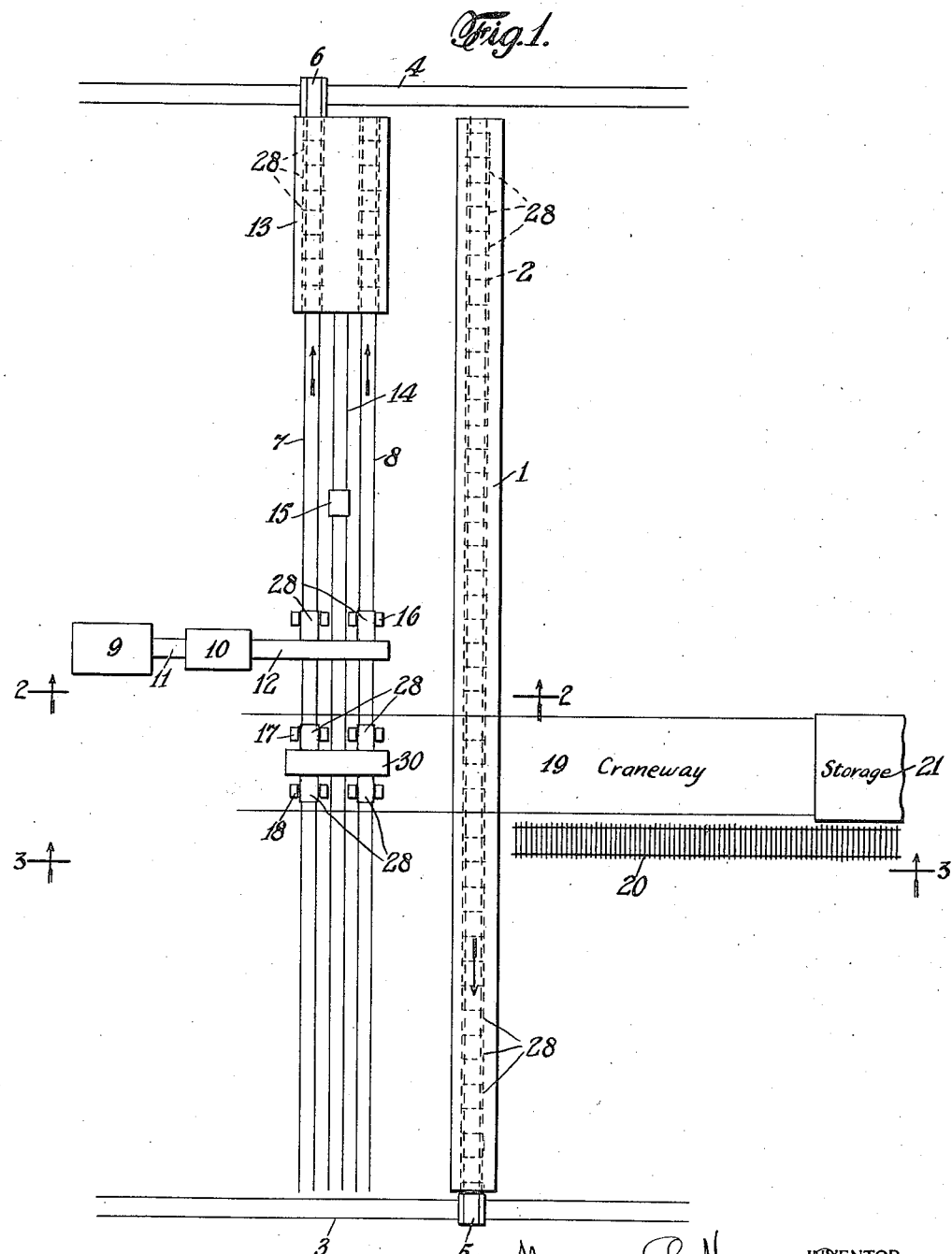

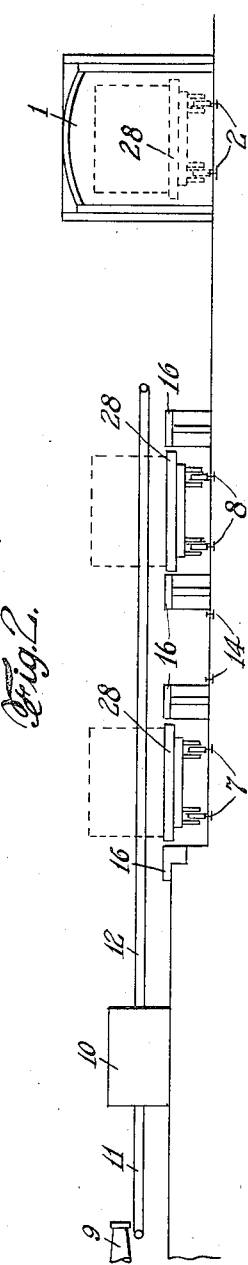

Patented Sept. 6, 1927.

1,641,582

UNITED STATES PATENT OFFICE.

WILLIAM LEE HANLEY, JR., OF BRADFORD, PENNSYLVANIA.

PLANT FOR MANUFACTURING CERAMIC PRODUCTS.

Application filed June 2, 1925. Serial No. 34,313.

My invention consists in the novel features hereinafter described, reference being had to the accompanying drawings which illustrate one embodiment of the same selected by me for purposes of illustration, and the said invention is fully disclosed in the following description and claims.

The object of my invention is to provide a brick making plant, comprising among its members a brick making machine, drier, and firing kiln of the tunnel car type, arranged in such manner that the bricks as they come from the brick making machine are loaded directly upon tunnel cars, carried on exterior tracks, and are conveyed in a direct and practically straight line to and through the drier, after which the cars are transferred to the tunnel kiln and passed longitudinally therethrough, to be preheated, fired and partially cooled therein, the cars being then transferred back to the exterior tracks and carried to an unloading point located closely adjacent to the brick machine, the empty cars being reloaded and the operation being practically a continuous operation, in which the cars always move either forward or laterally and never in a reverse direction. In other words, the path of movement of the tunnel kiln cars is substantially continuous from the loading point through the drier and kiln and back to the loading point without any retrograde steps and without any resetting of the bricks after the initial setting of the green bricks at the forming machine.

In carrying out my invention, I preferably provide a plurality of exterior tracks arranged parallel to and adjacent to the kiln, and at each end of the kiln I provide suitable means for transferring the tunnel cars from the exterior tracks to the kiln tracks at one end of the kiln, and from the kiln tracks to the exterior tracks at the other end of the kiln. The brick machine is located on the side of the exterior tracks opposite the kiln and near the center of length of said tracks, and the off-bearing belt extends transversely of the exterior tracks and over the same at a sufficient height to permit the tunnel cars to pass beneath it. Between the off-bearing belt and one of said transfer means, I provide a drier extending over portions of the exterior tracks, the drier being located preferably adjacent to the transfer means of the exterior tracks extending in a substantially straight line from the off-bearing belt to and through the drier. I also provide an unloading platform adjacent to the off-bearing belt and between it and the other transfer means at the opposite end of the kiln, and this unloading platform also extends transversely of the exterior tracks and sufficiently above the same to permit the tunnel cars to pass beneath. In connection with the unloading platform I provide a craneway, or its equivalent, for transporting the fired bricks from the unloading platform across over the top of the kiln to the shipping and storage point, which is located on the opposite side of the kiln and exterior tracks from the brick machine, thus leaving a portion of the plant adjacent to the brick machine clear for the reception, preparation and storage of the materials for the manufacture of the bricks.

According to my invention I also provide sufficient exterior trackage to enable the kiln to be operated continuously seven days in the week, regardless of the stoppage of the brick machine.

My invention also includes certain details of construction and operation hereinafter described, and particularly pointed out in the claims.

Referring to the accompanying drawings which illustrate one embodiment of my invention, Fig. 1 represents a plan view of a brick making plant embodying my invention, the various elements being indicated diagrammatically therein.

Fig. 2 represents a cross sectional view of the plant on line 2—2 of Fig. 1, adjacent to the off-bearing belt.

Fig. 3 is a similar cross sectional view adjacent to the unloading platform.

Referring to the drawings, 1 represents the kiln, which is preferably of the car tunnel type and provided with a track, 2, indicated in dotted lines in Fig. 1, extending therethrough. At each end of the kiln I preferably provide a transfer track, indicated at 3, and 4, each of said tracks being provided with a transfer truck indicated at 5 and 6, respectively. The transfer tracks, 3 and 4, extend laterally at one side of the kiln and I provide a plurality of tracks, in this instance two tracks, 7 and 8, extending from one transfer track to the other, substantially parallel to the kiln and adjacent thereto. 9 represents the brick machine shown diagrammatically herein and which may be of any desired type. For example, it may be of the type generally used for the manufacture of stiff mud bricks and provided with the usual cutting device indicated at 10, and connected thereto by a measuring apron, 11. 12 represents the off-bearing belt which extends from the cutter over the exterior tracks, 7 and 8, at a distance above the same so that the regular tunnel cars may be readily passed beneath the belt and brought into position adjacent thereto, so that they can be loaded with the moist bricks.

In plants of this character it has heretofore been the practice to set the green stiff mud bricks directly on drier cars, and owing to the slippery, greasy character of the bricks it was thought impractical to pile them more than two tiers high. After passing through the drier, where most of the occluded water was driven off and the temperature of the bricks had been raised to approximately 200° F., the bricks were allowed to cool, on exterior tracks, to about 90° F., or to such a degree that they could be conveniently handled. The bricks were then reset on tunnel kiln cars and passed into the kiln where the heat lost in necessary cooling to reset them had to be restored in the preheating zone.

I avoid all of the foregoing difficulties with their attendant increase in labor, and loss of heat and load the wet bricks directly on tunnel kiln cars where they remain until the finished product is ready for the market. The dried bricks are also placed directly in the kiln without any appreciable loss of heat, thus expediting the heating of the bricks in the preheating zone of the kiln. In the former plants it was also customary to transfer the drier cars with their green wet brick to transfer trucks in order to deliver the drier cars to the tracks extending through the drier or driers.

This may be practicable where only a few layers of bricks are placed upon a car, but in order to obtain maximum efficiency from a plant of this character, it is desirable to stack the bricks to a considerable height, for example, twelve to sixteen rows of bricks. As the moist bricks are coated with oil or another lubricant, as they pass through the die of the brick making machine, they are extremely slippery, especially when piled to a considerable height, and are apt to skid or move sidewise if the car is subjected to any appreciable jar, such as inevitably happens in transporting a car by means of a transferring truck, and the effect of transferring cars of these moist, undried bricks is to frequently cause a lateral movement of the layers upon each other, which may result in impairing the accuracy of their form, or, what is more serious, disturbing the equilibrium of the load so that the bricks will topple off the car in the drier or in the kiln and cause what is termed a "wreck". Such wrecks result in the destruction of a large part of the load of bricks, but they also tie up the plant to a greater or lesser extent, as the drier or the kiln in which the wreck occurs must be cooled sufficiently to permit employees to enter and clear the tracks. This takes considerable time in the case of a drier, but in the case of a wreck in the kiln, it requires about two days to cool the kiln and remove the débris and two additional days to reheat the kiln and get the plant in operation; so that these wrecks are very serious in their effect on production, and one of the objects of my invention is to eliminate the possibility of such wrecks. To this end, the exterior tracks, 7 and 8, extend in a substantially straight line from the off-bearing belt to and through the drier, indicated at 13, which is preferably located adjacent to one of the transfer tracks, in this case the transfer track, 4, so that the cars can be moved in a straight line from the off-bearing belt into and through the drier, upon either of said tracks, without transferring the cars until after they leave the drier, when the bricks are in a sufficiently hard condition not to be effected by the transfer. In order to move the cars to and through the drier with the least possible jar, I prefer to provide a third track, indicated at 14, between the tracks, 7 and 8, on which is located a locomotive, preferably operated by an electric motor, and which may be connected to the cars by a chain or other suitable means when it is desired to move the cars forward. I prefer to use an electric locomotive indicated at 15 in Fig. 1, having sufficient weight to give it the proper amount of traction on the track, 14, the electric motor being especially convenient and desirable in securing the gradual starting of the locomotive so that it will not unduly jar the bricks on the cars. The locomotive is preferably so constructed that it will pass beneath the off-bearing belt and the unloading platform as will be hereinafter described. The track, 14, is preferably extended from the transfer, 3, to the drier, 13, but does not enter the drier.

Adjacent to the off-bearing belt I provide suitable platforms, 16, on which the operators may stand when unloading the cars on either of the tracks, 7 or 8, and it will be noted that as the off-bearing belt extends at right angles to the tracks and over the same, the bricks may be loaded onto the cars by what is termed a quarter turn movement, that is to say, the operators are not required to move their bodies through more than a quarter turn in taking the bricks from the off-bearing belt and placing them upon the car. This is a distinct advantage and makes for speed and efficiency in hacking the bricks on the cars. Adjacent to the off-bearing belt and between it and the transfer track, 3, I provide an unloading and sorting platform, indicated at 30, which preferably extends across the exterior tracks, 7 and 8, at a sufficient height above the same so that the tunnel cars may be passed beneath it. As a matter of fact, I prefer to have the unloading and sorting platforms sufficiently high to permit cars bearing approximately half of their load of burned bricks to pass beneath the same, in order that after removing the upper layers down to a certain point the cars may be pushed beneath the unloading platform on either side of the tracks, 7 or 8, and another full car may be brought upon the opposite side, thus enabling the unloading to proceed from four cars on two tracks at once. I prefer to provide, adjacent to the unloading and sorting platform, a plurality of workmen's platforms indicated at 17, and 18, respectively, for this purpose. From the unloading platforms the burned bricks are conveyed to any suitable point for shipment or storage. I prefer to provide a craneway of any suitable type, as a monorail or ordinary craneway, extending from above the unloading and sorting platform perpendicularly to the tracks, 7 and 8, and over the top of the kiln, 1, to a shipping and storage point located on the opposite side of the kiln, from the tracks 7 and 8 and brick machine, 9. In this instance, I have shown in Fig. 1 an ordinary craneway at 19, adjacent to which is located a railed track indicated at 20, connected with a railway system for the accommodation of freight cars into which the bricks may be loaded from the crane, and I have also indicated a storage room or warehouse at 21, into which the bricks may be carried by the crane and stored if it is not desired to ship them immediately.

In Fig. 3 I have shown a crane, 22 of the monorail type, running on the rail, 19ª, and provided with a lifting yoke, 23, and hooks, 24, for engaging eyes or slots, 25 in the end plates of platforms or boxes, 26, by means of which a considerable quantity of bricks may be elevated and carried to the point of shipment, as the freight car indicated at 27. By locating the shipping and storage station on the opposite side of the kiln from the exterior tracks, 7 and 8, the opposite side of the kiln is left entirely free for the reception, preparation and storage of the materials entering into the manufacture of the brick. It will be understood that as soon as the tunnel cars are emptied at the unloading and sorting platforms, 16, they are moved in the direction of the arrows on tracks 7 and 8, beneath the off-bearing belt, where they are loaded with the green brick, and are moved forward in a direct line to and through the drier. As each car is pushed into the drier one is removed from the drier and is placed upon the transfer truck, 6, and transferred to the kiln tracks and pushed into the kiln in any desired manner. The kiln is kept full of cars so that as one car is pushed into the kiln from the transfer truck, 6, a car is pushed out of the other end of the kiln onto the transfer truck, 5, bearing its load of completely burned and partially cooled bricks, and such car is then transferred to either of the tracks 7 or 8 and gradually moved to the unloading platform. The kiln is thereby kept in step, so to speak, with the drier or vice versa. In other words, for every car which is moved into the drier, at stipulated intervals, one is removed therefrom and at the same time a car is placed in the kiln and one is removed from the kiln. Also as one is loaded one is unloaded. Thus it will be seen that during the operation of the forming machine there is a continuous procession of cars from the forming machine to and through the drier, to and through the kiln and back to the forming machine, all moving at stated intervals.

In order to secure efficiency in the operation of a plant having a tunnel kiln, it is extremely important that the kiln should run continuously and as it is not possible to run the entire plant continuously, it is necessary that storage space be provided for a sufficient amount of unfired bricks to keep the kiln supplied while the remainder of the plant is not in operation and to accommodate the cars of fired brick removed from the kiln during the same period. My improved plant is admirably adapted to meet this situation. These tunnel kilns are of great length, usually approximately 400 feet, more or less, and by arranging the exterior tracks parallel thereto between the transfer tracks, there is provided an extensive portion of the tracks, 7 and 8, leading from the off-bearing belt to and through the drier, sufficient to accommodate the required number of cars to supply the kiln and keep it in continuous operation when the rest of the plant is closed down, as Sunday, thus providing sufficient cars for the operation of the kiln for twenty-four hours. Obviously this will also take care of the operation of the kiln overnight in case the brick making machine is not operated for the full twenty-four hours during the six days of the week.

The location of the unloading platform, 16, also adjacent to the center, longitudinally, of the tracks, 7 and 8, and adjacent to the off-bearing belt, also provides an extensive length of the tracks, 7 and 8, between the transfer tracks, 3, and the unloading platform or sorting table, which will accommodate the cars of fired brick removed from the kiln during the twenty-four hour period, as Sunday, and of course will readily accommodate the cars removed during the night if the brick machine is not run for the full twenty-four hours of the day. With this arrangement of the plant, therefore, it is possible to run the kiln continuously without a loss of heat or lowering of temperature of any part of it, whether the brick machine is in operation or not, and a great saving of heat as well as a greatly increased output is thereby secured.

I have heretofore stated that I prefer to advance the cars, especially from the off-bearing belt into the drier by means of an electric locomotive, indicated at 15, and operating upon its own track located between adjacent tracks for the tunnel cars, and this is my preferred arrangement. In addition to the advantages of this method of car propulsion hereinbefore stated, it may also be noted that a further and great advantage is that should a car or series of cars become stuck and refuse to move owing to some obstruction on the rails or otherwise, as occasionally happens, the wheels of the locomotive will simply turn on their own rail while the locomotive will remain stationary and no injury to the cars or to the locomotive will result. Where pulling machines of the winding drum type are employed if the cars become stuck, the result is the breakage of the pulling machine or the connections between it and the cars, with the danger of serious accident and perhaps loss of life. Where tractors not mounted on rails are employed if the cars become stuck, or the load is greater than the tractor is able to pull, the tractor is apt to skid into the adjacent cars and produce a wreck, with the loss of output and at least a partial interruption of the operation of the plant. I have found, therefore, by practical experiment, that the arrangement herein shown and described is particularly desirable and efficient for the reasons stated. Furthermore, by the use of an electric locomotive operating on its own tracks and being able to pass beneath the off-bearing belt and unloading platform, single cars can be picked up and moved from the forming machine to and into the drier and from the transfer track 3 to the unloading platform. Such an arrangement and operation is not possible where the locomotive operates on the same track with the cars.

It will be understood that the kiln is provided with suitable heating means for effecting the pre-heating and firing of the bricks during their passage through the kiln on the tunnel cars, and the drier is likewise provided with heating means of any suitable character which may be supplied with spent hot gases from the kiln, or the drier may be otherwise heated for the purpose of effecting the preliminary drying of the bricks in any usual or well known way.

It will also be understood that by providing a continuous path of movement for the kiln cars and moving a car directly into the kiln from the drier, practically all of the heat imparted in the drier is retained, which obviates the necessity of restoring lost heat and driving off hygroscopically absorbed moisture, as where the bricks are allowed to cool for resetting from drier cars to kiln cars. The heating costs are thereby materially reduced and the cars can be passed through the kiln at a more rapid rate, thus increasing the capacity of the plant. I have previously stated that in order to obtain maximum efficiency from a plant of this character, it is desirable to stack the bricks to a considerable height on the kiln trucks, for example, 12 to 16 tiers. 12 to 16 tiers or rows are what is known as a "kiln load" and where I refer to a "kiln load" of bricks in the claims, it will be understood that it is a load consisting of twelve or more tiers or rows of bricks as distingushed from the ordinary drier load of two rows of bricks on a pallet.

While my invention is peculiarly advantageous for the manufacture of stiff mud bricks, I wish it to be understood that it may be employed also for the manufacture of pressed brick or any other kind of brick.

What I claim and desire to secure by Letters Patent is:

1. In a plant for manufacturing stiff mud ceramic products, the combination of a burning kiln of the tunnel type having a track for tunnel cars extending therethrough, an exterior track for tunnel cars substantially parallel thereto, transferring means at each end of said kiln and exterior tracks for transferring the tunnel cars from one to the other, of a forming machine located adjacent to the exterior track and near the center of its length and provided with an off bearing belt for conveying the moist bricks to tunnel cars on said exterior track, of a drier located in the line of the exterior track between the off bearing belt and one of said transfer means, and having its discharge end directly adjacent to said transfer means whereby the cars of dry products are transferred directly from the drier to the kiln without material loss of heat.

2. In a plant for the manufacture of stiff mud ceramic products, the combination with a burning kiln of the tunnel type, a forming machine for said products and means providing a continuous closed circuit path of movement for tunnel cars from the forming machine through the drier, directly to the kiln, through the kiln and back to the forming machine whereby the drier and kiln may be operated in step with each other.

3. In a plant for the manufacture of stiff mud ceramic products, the combination with a burning kiln of the tunnel type, a forming machine for said products located at one side of the kiln and near the center of its length, a drier located adjacent to one end of the kiln and means providing a continuous path of movement for tunnel cars from the forming machine to and through the drier, directly therefrom to the kiln, through the kiln and back to the forming machine, including storage trackage extending from the forming machine to the drier and from the delivery end of the kiln to the forming machine whereby the drier and kiln may be continuously operated in step with each other independent of the forming machine.

4. In a plant for manufacturing stiff mud ceramic products, the combinations with a burning kiln of the tunnel type, having a track for tunnel cars extending longitudinally therethrough, an exterior track for tunnel cars located alongside of the kiln and substantially parallel thereto, transferring means at each end of the kiln for transferring tunnel cars between the exterior track and the kiln track, of a forming machine located adjacent to the exterior track and near the center of its length, an off-bearing belt for conveying the moist bricks to the tunnel cars on said exterior track, and a drier located in the line of the exterior track between said off-bearing belt and one of said transfer means, said exterior track passing from the off-bearing belt in a substantially straight line and without interruption to and through the drier.

5. In a plant for manufacturing stiff mud ceramic products, the combination with a burning kiln of the tunnel type, having a track for tunnel cars extending longitudinally therethrough, an exterior track for tunnel cars located alongside of the kiln and substantially parallel thereto, transferring means at each end of the kiln for transferring tunnel cars between the exterior track and the kiln track, of a forming machine located adjacent to the exterior track and near the center of its length, an off-bearing belt for conveying the moist bricks to the tunnel cars on said exterior track, and a drier located in the line of the exterior track between said off-bearing belt and one of said transfer means, said exterior track passing from the off-bearing belt in a substantially straight line and without interruption to and through the drier, and an unloading station for receiving the fired bricks from the tunnel cars located between the off-bearing belt and the other transfer means.

6. In a plant for manufacturing stiff mud ceramic products, the combination with a burning kiln of the tunnel type, having a track for tunnel cars extending longitudinally therethrough, an exterior track for tunnel cars located alongside of the kiln and substantially parallel thereto, transferring means at each end of the kiln for transferring tunnel cars between the exterior track and the kiln track, of a forming machine located adjacent to the exterior track and near the center of its length, an off-bearing belt for conveying the moist bricks to the tunnel cars on said exterior track, and a drier located in the line of the exterior track between said off-bearing belt and one of said transfer means, said exterior track passing from the off-bearing belt in a substantially straight line and without interruption to and through the drier, an unloading station for receiving the fired bricks from the tunnel cars located between the off-bearing belt and the other transfer means, and conveying means extending from the unloading station over the top of the kiln to suitable shipping and storing points.

7. In a plant for manufacturing stiff mud ceramic products, the combination with a burning kiln of the tunnel type, having a track for tunnel cars extending longitudinally therethrough, an exterior track for tunnel cars located alongside of the kiln and substantially parallel thereto, transferring means at each end of the kiln for transferring tunnel cars between the exterior track and the kiln track, of a forming machine located adjacent to the exterior track and near the center of its length, an off-bearing belt for conveying the moist bricks to the tunnel cars on said exterior track, and a drier located in the line of the exterior track between said off-bearing belt and one of said transfer means, said exterior track passing from the off-bearing belt in a substantially straight line and without interruption to and through the drier, and an unloading station for receiving the fired bricks from the tunnel cars located between the off-bearing belt and the other transfer means, a shipping station and storage warehouse located on the side of the kiln opposite the exterior track and conveying means movable transversely of the kiln and exterior track and over the kiln for conveying the fired bricks from the unloading station to the shipping station and storage warehouse.

8. In a plant for manufacturing stiff mud ceramic products, the combination with a burning kiln of the tunnel type, having a track for tunnel cars extending longitudinally therethrough, of an exterior track for tunnel cars arranged alongside of the kiln and substantially parallel thereto, a forming machine, an off-bearing belt extending transversely over said exterior track and above the level of the tunnel cars thereon, said belt being disposed substantially perpendicular to the kiln and adjacent to the central portion of its length, transfer means at each end of the kiln for transferring tunnel cars between the exterior track and the kiln track, a drier located in alignment with and enclosing a portion of the exterior track between the off-bearing belt and one of said transfer means, the portion of said track between the off-bearing belt and the discharge end of said drier being uninterrupted and extending in a substantially straight line, and an unloading station on the line of the exterior track adjacent to the off-bearing belt.

9. In a plant for manufacturing stiff mud ceramic products, the combination with a burning kiln of the tunnel type, having a track for tunnel cars extending longitudinally therethrough, of an exterior track for tunnel cars arranged alongside of the kiln and substantially parallel thereto, a forming machine, an off-bearing belt extending transversely over said exterior track and above the level of the tunnel cars thereon, said belt being disposed substantially perpendicular to the kiln and adjacent to the central portion of its length, transfer means at each end of the kiln for transferring tunnel cars between the exterior track and the kiln track, a drier located in alignment with and enclosing a portion of the exterior track between the off-bearing belt and one of said transfer means and an unloading platform located adjacent to the off-bearing and above the level of the tunnel cars thereon.

10. In a plant for manufacturing stiff mud ceramic products, the combination with a burning kiln of the tunnel type, having a track for tunnel cars extending longitudinally therethrough, an exterior track for tunnel cars, transferring means at each end of the kiln for transferring tunnel cars between the exterior tracks and the kiln track, of a forming machine located adjacent to said exterior tracks, and a drier located in line with and enclosing a portion of the exterior tracks, the portion of the exterior tracks between the forming machine and the discharge end of the drier being without interruption whereby a kiln load of moist bricks may be moved directly into and through the drier and dried before being subjected to jar or transverse movement.

11. A brick-manufacturing plant comprising a long kiln, a dryer and a brick factory located at one side of said kiln, and a single circuit endless track system having substantially straight parallel runs, one extended through said kiln and the other extended past said brick factory and through said drying kiln.

12. A brick-manufacturing plant comprising a long kiln, a dryer, a brick factory, and an unloading zone located and aligned at one side of said kiln, and a single circuit endless track system having substantially straight parallel runs, one extended through said kiln and the other extended past said unloading zone and brick factory and though said drying kiln.

13. A brick plant comprising a long kiln, a track extended through said kiln, a second track extended along the outer side of said kiln, a brick factory located for delivery to trucks on said second noted track, a dryer through which said second noted track is passed, and transfers for delivering from the delivery end of the first noted track to the receiving end of the second noted track and from the delivery end of the second noted track to the receiving end of the first noted track.

14. A brick plant comprising a long kiln, a track extended through said kiln, a second track extended along the outer side of said kiln, a brick factory located for delivery to trucks on said second noted track, a dryer through which said second noted track is passed, transfers for delivering from the delivery end of the first noted track to the receiving end of the second noted track and from the delivery end of the second noted track to the receiving end of the first noted track, and an unloading zone or platform adjacent said brick factory and along the receiving end portion of said second noted track.

In testimony whereof I affix my signature.

WILLIAM LEE HANLEY, Jr.